United States Patent
Nelson et al.

(10) Patent No.: US 9,919,481 B2
(45) Date of Patent: Mar. 20, 2018

(54) STRUCTURAL MEMBER FORMED FROM A SOLID LINEAL PROFILE

(71) Applicant: Ticona LLC, Florence, KY (US)

(72) Inventors: Sherri M. Nelson, St. Croix, MN (US); David W. Eastep, Winona, MN (US); Timothy A. Regan, Winona, MN (US); Michael L. Wesley, Dover, MN (US); Richard Steihm, Winona, MN (US)

(73) Assignee: Ticona LLC, Florence, KY (US)

( * ) Notice: Subject to any disclaimer, the term of this patent is extended or adjusted under 35 U.S.C. 154(b) by 171 days.

(21) Appl. No.: 14/965,967

(22) Filed: Dec. 11, 2015

(65) Prior Publication Data

US 2016/0096335 A1 Apr. 7, 2016

Related U.S. Application Data

(62) Division of application No. 13/698,389, filed as application No. PCT/US2011/039953 on Jun. 10, 2011, now Pat. No. 9,238,347.

(Continued)

(51) Int. Cl.
*B29C 70/02* (2006.01)
*B29C 70/20* (2006.01)
(Continued)

(52) U.S. Cl.
CPC .......... *B29C 70/021* (2013.01); *B29B 15/122* (2013.01); *B29C 70/20* (2013.01); *B29C 70/521* (2013.01); *B32B 5/00* (2013.01); *B32B 5/12* (2013.01); *B32B 27/08* (2013.01); *B32B 27/28* (2013.01); *B32B 27/288* (2013.01); *B32B 27/302* (2013.01); *B32B 27/32* (2013.01);
(Continued)

(58) Field of Classification Search
CPC .......................... B29C 70/021; B29K 2101/12
USPC .......................................................... 156/199
See application file for complete search history.

(56) References Cited

U.S. PATENT DOCUMENTS

| 3,669,158 A | 6/1972 | Phillips |
| 4,394,338 A | 7/1983 | Fuwa |

(Continued)

FOREIGN PATENT DOCUMENTS

| BY | 11906 C1 | 2/2009 |
| DE | 19936915 | 12/2000 |

(Continued)

OTHER PUBLICATIONS

International Search Report for PCT/US2011/039953 dated Dec. 19, 2011, 3 pages.
Chinese Search Report dated Jun. 19, 2014, 2 pages.

*Primary Examiner* — Brent T O'Hern
(74) *Attorney, Agent, or Firm* — Dority & Manning, P.A.

(57) ABSTRACT

A structural member that contains a solid lineal profile that is formed from a plurality of consolidated ribbons is provided. Each of the ribbons includes unidirectionally aligned continuous fibers embedded within a thermoplastic polymer matrix. The continuous fiber ribbons are laminated together during pultrusion to form an integral solid profile having very high tensile strength properties. Contrary to conventional wisdom, the present inventors have discovered that careful control over certain aspects of the pultrusion process can allow such high strength profiles to be readily formed without adversely impacting the pultrusion apparatus.

13 Claims, 8 Drawing Sheets

Related U.S. Application Data

(60) Provisional application No. 61/353,885, filed on Jun. 11, 2010.

(51) Int. Cl.

| | | |
|---|---|---|
| *B29C 70/52* | (2006.01) | |
| *B32B 5/00* | (2006.01) | |
| *B32B 5/12* | (2006.01) | |
| *B29B 15/12* | (2006.01) | |
| *B32B 27/08* | (2006.01) | |
| *B32B 27/28* | (2006.01) | |
| *B32B 27/30* | (2006.01) | |
| *B32B 27/32* | (2006.01) | |
| *B32B 27/34* | (2006.01) | |
| *B32B 27/36* | (2006.01) | |
| *B32B 27/40* | (2006.01) | |
| *B29K 101/12* | (2006.01) | |
| *B29L 31/00* | (2006.01) | |

(52) U.S. Cl.
CPC ............ *B32B 27/322* (2013.01); *B32B 27/34* (2013.01); *B32B 27/36* (2013.01); *B32B 27/365* (2013.01); *B32B 27/40* (2013.01); *B29K 2101/12* (2013.01); *B29L 2031/008* (2013.01); *B32B 2262/0253* (2013.01); *B32B 2262/0261* (2013.01); *B32B 2262/0269* (2013.01); *B32B 2262/0276* (2013.01); *B32B 2262/101* (2013.01); *B32B 2262/103* (2013.01); *B32B 2262/105* (2013.01); *B32B 2262/106* (2013.01); *B32B 2307/54* (2013.01); *B32B 2307/732* (2013.01); *B32B 2419/00* (2013.01); *Y10T 156/1007* (2015.01); *Y10T 428/24132* (2015.01)

(56) References Cited

U.S. PATENT DOCUMENTS

| | | |
|---|---|---|
| 4,541,884 A | 9/1985 | Cogswell et al. |
| 4,549,920 A | 10/1985 | Cogswell et al. |
| 4,564,540 A | 1/1986 | Davies et al. |
| 4,588,538 A | 5/1986 | Chung et al. |
| 4,640,064 A | 2/1987 | Harris et al. |
| 4,640,065 A | 2/1987 | Harris et al. |
| 4,681,722 A | 7/1987 | Carter et al. |
| 4,749,613 A | 6/1988 | Yamada et al. |
| 4,752,313 A | 6/1988 | Allaire et al. |
| 4,752,513 A | 6/1988 | Rau et al. |
| RE32,772 E | 10/1988 | Hawley |
| 4,792,481 A | 12/1988 | O'Connor et al. |
| 4,874,563 A | 10/1989 | McMahon et al. |
| 4,883,552 A | 11/1989 | O'Connor et al. |
| 4,924,631 A | 5/1990 | Davies et al. |
| 4,937,028 A | 6/1990 | Glemet et al. |
| 4,938,823 A | 7/1990 | Balazek et al. |
| 4,984,402 A | 1/1991 | Davies |
| 4,992,229 A | 2/1991 | Beever |
| 5,026,410 A | 6/1991 | Pollet et al. |
| 5,026,447 A | 6/1991 | O'Connor |
| 5,091,036 A | 2/1992 | Taylor |
| 5,095,632 A | 3/1992 | Hassler, Jr. et al. |
| 5,098,496 A | 3/1992 | Breitigam et al. |
| 5,114,516 A | 5/1992 | Pilling et al. |
| 5,120,380 A | 6/1992 | Strachan |
| 5,122,417 A | 6/1992 | Murakami et al. |
| 5,128,198 A | 7/1992 | Dyksterhouse et al. |
| 5,174,844 A | 12/1992 | Tong |
| 5,198,172 A * | 3/1993 | Spoo .................. B29C 33/306 156/180 |
| 5,225,020 A | 7/1993 | Millett et al. |
| 5,225,140 A | 7/1993 | Hayashikoshi et al. |
| 5,266,139 A | 11/1993 | Yokota et al. |
| 5,294,461 A | 3/1994 | Ishida |
| 5,324,377 A | 6/1994 | Davies |
| 5,336,526 A * | 8/1994 | Spoo .................. B29C 35/06 427/316 |
| 5,401,154 A | 3/1995 | Sargent |
| 5,492,583 A | 2/1996 | Fingerson et al. |
| 5,492,743 A | 2/1996 | Schroll et al. |
| 5,503,928 A | 4/1996 | Cheshire |
| 5,520,867 A | 5/1996 | Shirai et al. |
| 5,534,210 A | 7/1996 | Shirai et al. |
| 5,540,986 A | 7/1996 | Kimura et al. |
| 5,552,215 A | 9/1996 | Tredway et al. |
| 5,556,496 A | 9/1996 | Sumerak |
| 5,585,155 A | 12/1996 | Heikkila et al. |
| 5,700,417 A | 12/1997 | Fernyhough et al. |
| 5,716,479 A | 2/1998 | Mikats et al. |
| 5,716,487 A | 2/1998 | Sumerak |
| 5,727,357 A | 3/1998 | Arumugasaamy et al. |
| 5,747,075 A | 5/1998 | Gauchel et al. |
| 5,779,961 A | 7/1998 | Teutsch |
| 5,783,013 A | 7/1998 | Beckman et al. |
| 5,792,529 A | 8/1998 | May |
| 5,830,304 A | 11/1998 | Priesnitz et al. |
| 5,882,564 A | 3/1999 | Puppin |
| 5,902,755 A | 5/1999 | Driggett et al. |
| 5,911,932 A | 6/1999 | Dyksterhouse |
| 5,935,508 A | 8/1999 | Fernyhough et al. |
| 6,007,656 A | 12/1999 | Heikkila et al. |
| 6,037,056 A | 3/2000 | Macdonald et al. |
| 6,045,876 A | 4/2000 | Fellers et al. |
| 6,048,427 A | 4/2000 | Gauchel et al. |
| 6,090,319 A | 7/2000 | Sharma et al. |
| 6,106,944 A | 8/2000 | Heikkila et al. |
| 6,122,877 A | 9/2000 | Hendrickson et al. |
| 6,185,962 B1 | 2/2001 | Hartman et al. |
| 6,260,251 B1 | 7/2001 | Guhl |
| 6,346,325 B1 | 2/2002 | Edwards et al. |
| 6,387,179 B1 | 5/2002 | Anderson et al. |
| 6,524,690 B1 | 2/2003 | Dyksterhouse |
| 6,656,316 B1 | 12/2003 | Dyksterhouse |
| 6,709,995 B1 | 3/2004 | Dyksterhouse |
| 6,746,747 B2 | 6/2004 | Davies et al. |
| 6,763,869 B2 | 7/2004 | Sakai et al. |
| 6,794,032 B2 | 9/2004 | Borgner et al. |
| 6,808,796 B1 | 10/2004 | Miyao et al. |
| 6,821,613 B1 | 11/2004 | Kagi et al. |
| 6,846,857 B1 | 1/2005 | Lindner |
| 6,854,791 B1 | 2/2005 | Jaggi |
| 6,872,273 B2 | 3/2005 | Davies et al. |
| 6,872,343 B2 | 3/2005 | Edwards et al. |
| 6,881,288 B2 | 4/2005 | Davies et al. |
| 6,955,735 B2 | 10/2005 | Kusek |
| 7,249,943 B2 | 7/2007 | Benson et al. |
| 7,276,132 B2 | 10/2007 | Davies et al. |
| 7,297,740 B2 | 11/2007 | Dyksterhouse |
| 7,387,147 B2 | 6/2008 | Johnson et al. |
| 7,402,268 B2 | 7/2008 | Boissonnat et al. |
| 7,413,623 B2 | 8/2008 | Raday |
| 7,470,388 B2 | 12/2008 | Hüsler et al. |
| 7,824,770 B2 | 11/2010 | Honma et al. |
| 2001/0047844 A1 | 12/2001 | Edwards et al. |
| 2002/0061374 A1 | 5/2002 | O'Brien et al. |
| 2002/0110680 A1 | 8/2002 | Bank et al. |
| 2002/0123288 A1 | 9/2002 | Davies et al. |
| 2003/0003265 A1 | 1/2003 | Davies et al. |
| 2004/0009338 A1 | 1/2004 | Jo et al. |
| 2005/0008804 A1 | 1/2005 | Davies et al. |
| 2006/0087059 A1 | 4/2006 | Boissonnat et al. |
| 2006/0165955 A1 | 7/2006 | Ruegg et al. |
| 2006/0280938 A1 | 12/2006 | Atkinson |
| 2007/0113958 A1 | 5/2007 | Brown et al. |
| 2007/0113983 A1 | 5/2007 | Brown et al. |
| 2007/0116941 A1 | 5/2007 | Brown et al. |
| 2007/0125301 A1 | 6/2007 | Zhou et al. |
| 2007/0126142 A1 | 6/2007 | Zhou et al. |
| 2007/0183843 A1 | 8/2007 | Spaans et al. |
| 2007/0243368 A1 | 10/2007 | Edwards |
| 2008/0053596 A1 | 3/2008 | Davies et al. |
| 2008/0300355 A1 | 12/2008 | Kenny et al. |

(56) References Cited

U.S. PATENT DOCUMENTS

| | | |
|---|---|---|
| 2009/0011210 A1 | 1/2009 | Gao et al. |
| 2009/0023870 A1 | 1/2009 | Berksoy et al. |
| 2009/0071593 A1 | 3/2009 | Slaback et al. |
| 2009/0104418 A1 | 4/2009 | Ohki et al. |
| 2009/0123693 A1 | 5/2009 | Paul |
| 2009/0206515 A1 | 8/2009 | Jansen et al. |
| 2009/0324923 A1 | 12/2009 | Gleich et al. |
| 2010/0108812 A1 | 5/2010 | Boursier et al. |
| 2011/0049750 A1 | 3/2011 | Bechtold |

FOREIGN PATENT DOCUMENTS

| | | |
|---|---|---|
| EP | 0155552 | 9/1985 |
| EP | 0444867 | 9/1991 |
| EP | 0281447 | 9/1998 |
| FR | 2266595 | 10/1975 |
| GB | 1302049 | 1/1973 |
| GB | 2041489 | 9/1980 |
| GB | 2262470 | 6/1993 |
| GB | 2448363 | 10/2008 |
| JP | H06-31821 | 2/1994 |
| JP | H07-251437 | 10/1995 |
| JP | H09-155862 | 6/1997 |
| JP | H09-203159 | 8/1997 |
| JP | 2009-290382 | 10/2000 |
| WO | 92/03277 | 3/1992 |
| WO | 00/78529 | 12/2000 |
| WO | 2004/080698 | 9/2004 |
| WO | 2006/044315 | 4/2006 |

\* cited by examiner

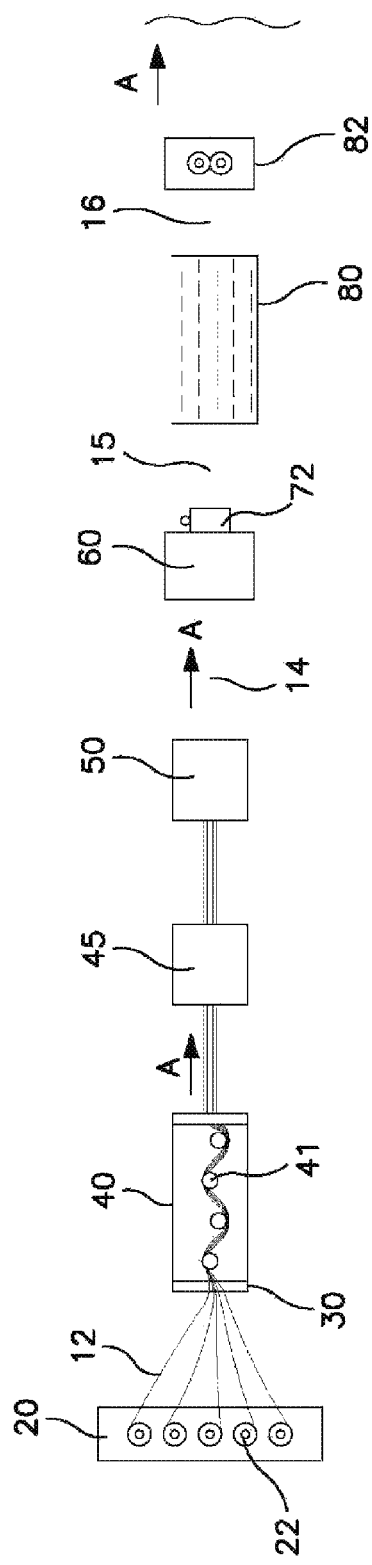
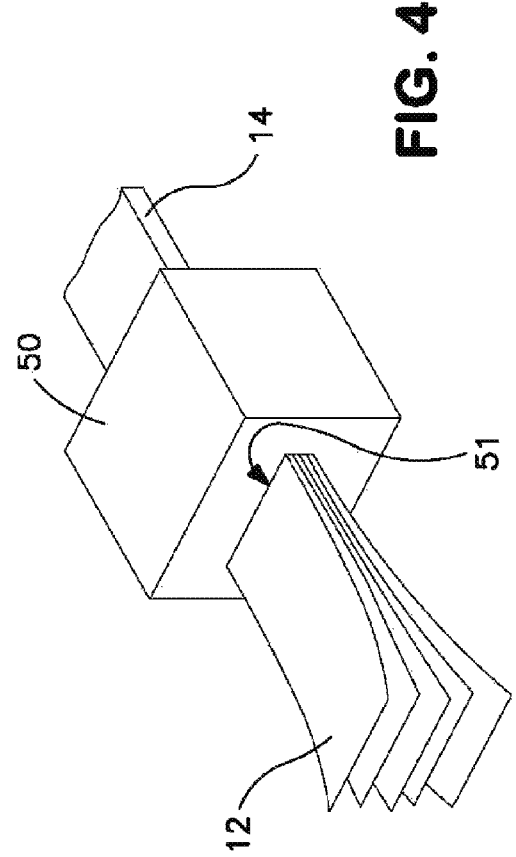

STRUCTURAL MEMBER FORMED FROM A SOLID LINEAL PROFILE

The present application claims priority as a divisional application of U.S. Ser. No. 13/698,389, filed Nov. 16, 2012, which is a U.S. National Stage filing of International Patent Application No. PCT/US2011/039953 filed Jun. 10, 2011, which claims priority to Provisional Application Ser. No. 61/353,885, filed Jun. 11, 2010, the entire contents of which are incorporated herein by reference thereto.

BACKGROUND OF THE INVENTION

Solid profiles are often formed by pultruding one or more fiber-reinforced ribbons through a die that shapes the ribbons into the desired configuration. The ribbons may include unidirectionally aligned continuous fibers embedded within a polymer matrix. Because the profiles have continuous fibers oriented in the machine direction (longitudinal), they often exhibit good tensile strength in the machine direction. Unfortunately, however, the maximum degree of tensile strength that is achievable is often limited due to the difficulty in processing materials of a very high degree of strength. As such, a need currently exists for a solid profile that exhibits excellent tensile strength, and yet can be made in a relatively efficient and simple manner.

SUMMARY OF THE INVENTION

In accordance with one embodiment of the present invention, a structural member is disclosed that comprises a solid lineal profile. The solid lineal profile contains a first component formed from a consolidated laminate of ribbons, wherein each ribbon of the laminate contains a plurality of continuous fibers that are substantially oriented in a longitudinal direction and a resinous matrix that contains one or more thermoplastic polymers and within which the continuous fibers are embedded. The continuous fibers constitute from about 40 wt. % to about 90 wt. % of the ribbon and the thermoplastic polymers constitute from about 10 wt. % to about 60 wt. % of the ribbon. The flexural modulus is about 10 Gigapascals or more.

In accordance with another embodiment of the present invention, a method for forming a solid lineal profile is disclosed that comprises supplying a plurality of individual ribbons. Each ribbon contains a plurality of continuous fibers that are substantially oriented in a longitudinal direction and a resinous matrix that contains one or more thermoplastic polymers and within which the continuous fibers are embedded, the continuous fibers constituting from about 40 wt. % to about 90 wt. % of the ribbon and the thermoplastic polymers constituting from about 10 wt. % to about 60 wt. % of the ribbon. The ribbons are heated to a temperature at or above the softening temperature of the resinous matrix. The heated ribbons are pulled through a first die to consolidate the ribbons together and form a laminate and through a second die to shape the laminate. The shaped laminate is cooled to form the solid profile.

Other features and aspects of the present invention are set forth in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which:

FIG. 3 is a schematic illustration of one embodiment of a pultrusion system that may be employed in the present invention;

FIG. 4 is a perspective view of one embodiment of a pultrusion die that may be employed in the system of FIG. 3;

Figure 1:
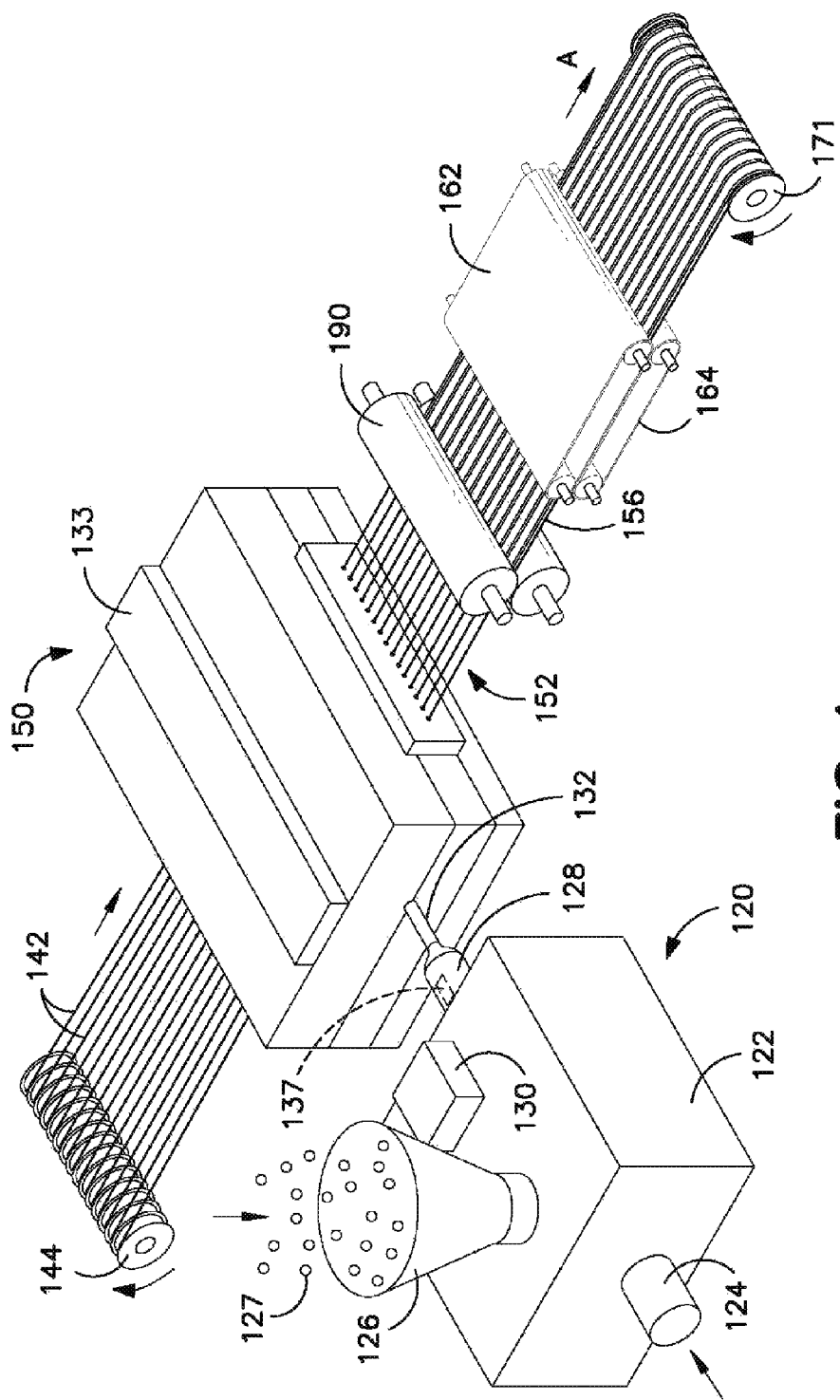
FIG. 1 is a schematic illustration of one embodiment of an impregnation system for use in the present invention.

Repeat use of reference characters in the present specification and drawings is intended to represent the same or analogous features or elements of the present invention.

DETAILED DESCRIPTION OF REPRESENTATIVE EMBODIMENTS

Definitions

As used herein, the term "profile" generally refers to a pultruded part. The profile may possess a wide variety of cross-sectional shapes, such as square, rectangular, circular, elliptical, triangular, I-shaped, C-shaped, U-shaped, J-shaped, L-shaped, etc.

As used herein, the term "lineal" generally refers to a cross-sectional shape that is substantially the same along the entire length of the profile.

As used herein, the term "continuous fibers" generally refers to fibers, filaments, yarns, or rovings (e.g., bundles of fibers) having a length greater than about 8 millimeters, in some embodiments about 15 millimeters or more, and in some embodiments, about 20 millimeters or more.

As used herein, the term "discontinuous fibers" generally refers to fibers, filaments, yarns, or rovings that are not continuous. Such fibers typically have a length of about 8 millimeters or less. For example, discontinuous fibers may include short or long fibers. "Long fibers" are typically those fibers having a length of from about 0.5 to about 8 millimeters, in some embodiments, from about 0.8 to about 6 millimeters, and in some embodiments, from about 1 to about 5 millimeters. "Short fibers" are typically those fibers having a length of about 0.5 millimeter or less, in some embodiments about 0.01 to about 0.4 millimeters, and in some embodiments, from about 0.05 to about 0.3 millimeters.

Detailed Description

It is to be understood by one of ordinary skill in the art that the present discussion is a description of exemplary embodiments only, and is not intended as limiting the broader aspects of the present invention.

Generally speaking, the present invention is directed to a structural member for use in various applications, such as windows, doors, siding panels, decking, flooring, etc. The structural member contains a solid lineal profile that is formed from a plurality of consolidated ribbons, each of which includes unidirectionally aligned continuous fibers embedded within a thermoplastic polymer matrix. The continuous fiber ribbons are laminated together during pultrusion to form an integral solid profile having very high tensile strength properties. Contrary to conventional wisdom, the present inventors have discovered that careful control over certain aspects of the pultrusion process can allow such high strength profiles to be readily formed without adversely impacting the pultrusion apparatus. Various embodiments of the present invention will now be described in more detail.

The continuous fibers employed in the present invention may be formed from any conventional material known in the art, such as metal fibers; glass fibers (e.g., E-glass, A-glass, C-glass, D-glass, AR-glass, R-glass, S1-glass, S2-glass), carbon fibers (e.g., graphite), boron fibers, ceramic fibers (e.g., alumina or silica), aramid fibers (e.g., Kevlar® marketed by E. I. duPont de Nemours, Wilmington, Del.), synthetic organic fibers (e.g., polyamide, polyethylene, paraphenylene, terephthalamide, polyethylene terephthalate and polyphenylene sulfide), and various other natural or synthetic inorganic or organic fibrous materials known for reinforcing thermoplastic compositions. Glass fibers and carbon fibers are particularly desirable for use in the continuous fibers. Such fibers often have a nominal diameter of about 4 to about 35 micrometers, and in some embodiments, from about 9 to about 35 micrometers. The fibers may be twisted or straight. If desired, the fibers may be in the form of rovings (e.g., bundle of fibers) that contain a single fiber type or different types of fibers. Different fibers may be contained in individual rovings or, alternatively, each roving may contain a different fiber type. For example, in one embodiment, certain rovings may contain continuous carbon fibers, while other rovings may contain glass fibers. The number of fibers contained in each roving can be constant or vary from roving to roving. Typically, a roving may contain from about 1,000 fibers to about 50,000 individual fibers, and in some embodiments, from about 2,000 to about 40,000 fibers.

Any of a variety of thermoplastic polymers may be employed to form the thermoplastic matrix in which the continuous are embedded. Suitable thermoplastic polymers for use in the present invention may include, for instance, polyolefins (e.g., polypropylene, propylene-ethylene copolymers, etc.), polyesters (e.g., polybutylene terephalate ("PBT")), polycarbonates, polyamides (e.g., Nylon™), polyether ketones (e.g., polyetherether ketone ("PEEK")), polyetherimides, polyarylene ketones (e.g., polyphenylene diketone ("PPDK")), liquid crystal polymers, polyarylene sulfides (e.g., polyphenylene sulfide ("PPS")), fluoropolymers (e.g., polytetrafluoroethylene-perfluoromethylvinylether polymer, perfluoro-alkoxyalkane polymer, petrafluoroethylene polymer, ethylene-tetrafluoroethylene polymer, etc.), polyacetals, polyurethanes, polycarbonates, styrenic polymers (e.g., acrylonitrile butadiene styrene ("ABS")), and so forth. Polybutylene terephalate ("PBT") is a particularly suitable thermoplastic polymer.

The continuous fiber ribbons of the present invention are generally formed using an extrusion device within which the continuous fibers are embedded with the thermoplastic matrix. Among other things, the extrusion device facilitates the ability of the thermoplastic polymer to be applied to the entire surface of the fibers. The resulting ribbon also has a very low void fraction, which helps enhance the strength of the ribbon. For instance, the void fraction may be about 3% or less, in some embodiments about 2% or less, and in some embodiments, about 1% or less. The void fraction may be measured using techniques well known to those skilled in the art. For example, the void fraction may be measured using a "resin burn off" test in which samples are placed in an oven (e.g., at 600° C. for 3 hours) to burn out the resin. The mass of the remaining fibers may then be measured to calculate the weight and volume fractions. Such "burn off" testing may be performed in accordance with ASTM D 2584-08 to determine the weights of the fibers and the thermoplastic matrix, which may then be used to calculate the "void fraction" based on the following equations:

$$V_f = 100*(\rho_t - \rho_c)/\rho_t$$

where, $V_f$ is the void fraction as a percentage;

$\rho_c$ is the density of the composite as measured using known techniques, such as with a liquid or gas pycnometer (e.g., helium pycnometer);

$\rho_t$ is the theoretical density of the composite as is determined by the following equation:

$$\rho_t = 1/[W_f/\rho_f + W_m/\rho_m]$$

$\rho_m$ is the density of the thermoplastic matrix (e.g., at the appropriate crystallinity);

$\rho_f$ is the density of the fibers;

$W_f$ is the weight fraction of the fibers; and $W_m$ is the weight fraction of the thermoplastic matrix.

Alternatively, the void fraction may be determined by chemically dissolving the resin in accordance with ASTM D 3171-09. The "burn off" and "dissolution" methods are particularly suitable for glass fibers, which are generally resistant to melting and chemical dissolution. In other cases, however, the void fraction may be indirectly calculated based on the densities of the thermoplastic polymer, fibers, and ribbon in accordance with ASTM D 2734-09 (Method A), where the densities may be determined ASTM D792-08 Method A. Of course, the void fraction can also be estimated using conventional microscopy equipment.

Referring to FIG. 1, for example, one embodiment of an extrusion device is shown that may be employed to impregnate the fibers with a thermoplastic polymer. More particularly, the apparatus includes an extruder 120 containing a screw shaft 124 mounted inside a barrel 122. A heater 130 (e.g., electrical resistance heater) is mounted outside the barrel 122. During use, a thermoplastic polymer feedstock 127 is supplied to the extruder 120 through a hopper 126. The thermoplastic feedstock 127 is conveyed inside the barrel 122 by the screw shaft 124 and heated by frictional forces inside the barrel 122 and by the heater 130. Upon being heated, the feedstock 127 exits the barrel 122 through a barrel flange 128 and enters a die flange 132 of an impregnation die 150.

A continuous fiber roving 142 or a plurality of continuous fiber rovings 142 are supplied from a reel or reels 144 to die 150. The rovings 142 are generally kept apart a certain distance before impregnation, such as at least about 4 millimeters, and in some embodiments, at least about 5 millimeters. The feedstock 127 may further be heated inside the die by heaters 133 mounted in or around the die 150. The die is generally operated at temperatures that are sufficient to cause melting and impregnation of the thermoplastic polymer. Typically, the operation temperatures of the die is higher than the melt temperature of the thermoplastic polymer, such as at temperatures from about 200° C. to about 450° C. When processed in this manner, the continuous fiber rovings 142 become embedded in the polymer matrix, which may be a resin 214 (FIG. 2A) processed from the feedstock 127. The mixture is then extruded from the impregnation die 150 to create an extrudate 152.

A pressure sensor 137 (FIG. 2A) senses the pressure near the impregnation die 150 to allow control to be exerted over the rate of extrusion by controlling the rotational speed of the screw shaft 124, or the federate of the feeder. That is, the pressure sensor 137 is positioned near the impregnation die 150 so that the extruder 120 can be operated to deliver a correct amount of resin 214 for interaction with the fiber rovings 142. After leaving the impregnation die 150, the extrudate 152, or impregnated fiber rovings 142, may enter an optional pre-shaping, or guiding section (not shown) before entering a nip formed between two adjacent rollers 190. Although optional, the rollers 190 can help to consolidate the extrudate 152 into the form of a ribbon (or tape), as well as enhance fiber impregnation and squeeze out any excess voids. In addition to the rollers 190, other shaping devices may also be employed, such as a die system. The resulting consolidated ribbon 156 is pulled by tracks 162 and 164 mounted on rollers. The tracks 162 and 164 also pull the extrudate 152 from the impregnation die 150 and through the rollers 190. If desired, the consolidated ribbon 156 may be wound up at a section 171. Generally speaking, the ribbons are relatively thin and typically have a thickness of from about 0.05 to about 1 millimeter, in some embodiments from about 0.1 to about 0.8 millimeters, and in some embodiments, from about 0.2 to about 0.4 millimeters.

Within the impregnation die, it is generally desired that the rovings 142 are traversed through an impregnation zone 250 to impregnate the rovings with the polymer resin 214. In the impregnation zone 250, the polymer resin may be forced generally transversely through the rovings by shear and pressure created in the impregnation zone 250, which significantly enhances the degree of impregnation. This is particularly useful when forming a composite from ribbons of a high fiber content, such as about 35% weight fraction ("Wf") or more, and in some embodiments, from about 40% Wf or more. Typically, the die 150 will include a plurality of contact surfaces 252, such as for example at least 2, at least 3, from 4 to 7, from 2 to 20, from 2 to 30, from 2 to 40, from 2 to 50, or more contact surfaces 252, to create a sufficient degree of penetration and pressure on the rovings 142. Although their particular form may vary, the contact surfaces 252 typically possess a curvilinear surface, such as a curved lobe, rod, etc. The contact surfaces 252 are also typically made of a metal material.

Figure 2A:
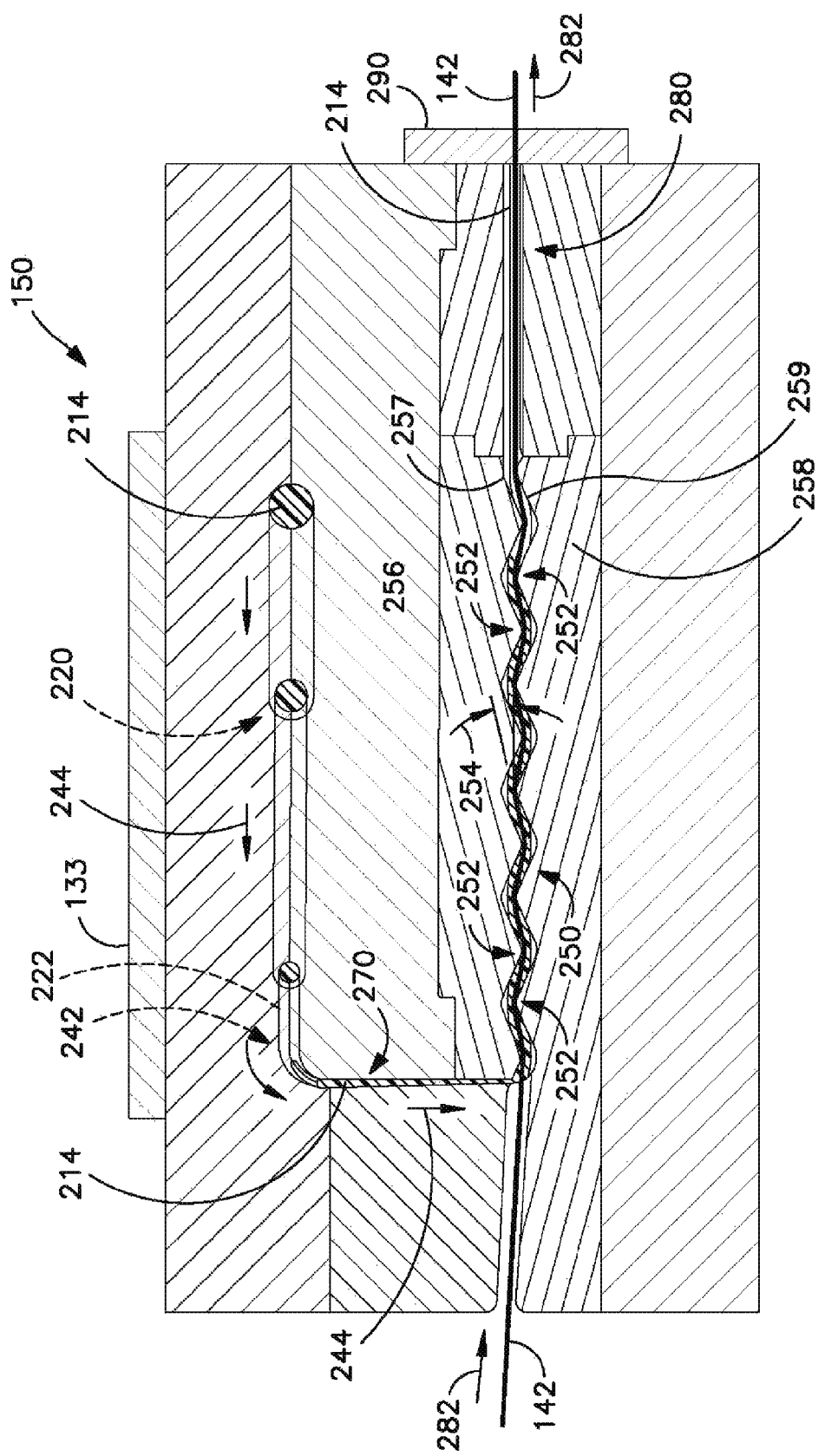
FIG. 2A is a cross-sectional view of the impregnation die shown in FIG. 1.

FIG. 2A shows a cross-sectional view of an impregnation die 150. As shown, the impregnation die 150 includes a manifold assembly 220, a gate passage 270, and an impregnation zone 250. The manifold assembly 220 is provided for flowing the polymer resin 214 therethrough. For example, the manifold assembly 220 may include a channel 222 or a plurality of channels 222. The resin 214 provided to the impregnation die 150 may flow through the channels 222.

Figure 2B:
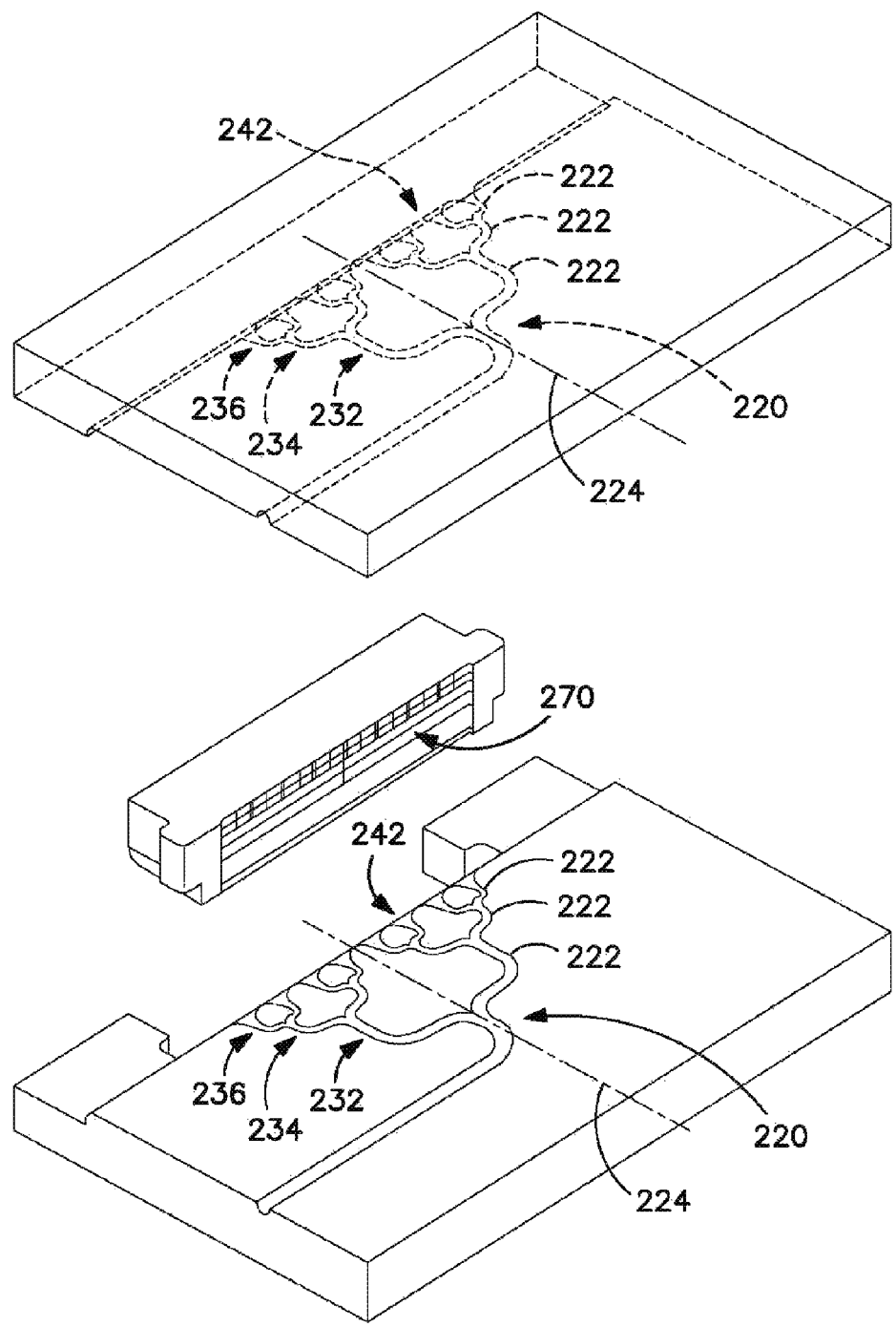
FIG. 2B is an exploded view of one embodiment of a manifold assembly and gate passage for an impregnation die that may be employed in the present invention.

As shown in FIG. 2B, some portions of the channels 222 may be curvilinear, and in exemplary embodiments, the channels 222 have a symmetrical orientation along a central axis 224. Further, in some embodiments, the channels may be a plurality of branched runners 222, which may include first branched runner group 232, second group 234, third group 236, and, if desired, more branched runner groups. Each group may include 2, 3, 4 or more runners 222 branching off from runners 222 in the preceding group, or from an initial channel 222.

The branched runners 222 and the symmetrical orientation thereof generally evenly distribute the resin 214, such that the flow of resin 214 exiting the manifold assembly 220 and coating the rovings 142 is substantially uniformly distributed on the rovings 142. This desirably allows for generally uniform impregnation of the rovings 142.

Further, the manifold assembly 220 may in some embodiments define an outlet region 242, which generally encompasses at least a downstream portion of the channels or runners 222 from which the resin 214 exits. In some embodiments, at least a portion of the channels or runners 222 disposed in the outlet region 242 have an increasing area in a flow direction 244 of the resin 214. The increasing area allows for diffusion and further distribution of the resin 214 as the resin 214 flows through the manifold assembly 220, which further allows for substantially uniform distribution of the resin 214 on the rovings 142.

As further illustrated in FIGS. 2A and 2B, after flowing through the manifold assembly 220, the resin 214 may flow through gate passage 270. Gate passage 270 is positioned between the manifold assembly 220 and the impregnation zone 250, and is provided for flowing the resin 214 from the manifold assembly 220 such that the resin 214 coats the rovings 142. Thus, resin 214 exiting the manifold assembly 220, such as through outlet region 242, may enter gate passage 270 and flow therethrough, as shown.

Upon exiting the manifold assembly 220 and the gate passage 270 of the die 150 as shown in FIG. 2A, the resin 214 contacts the rovings 142 being traversed through the die 150. As discussed above, the resin 214 may substantially uniformly coat the rovings 142, due to distribution of the resin 214 in the manifold assembly 220 and the gate passage 270. Further, in some embodiments, the resin 214 may impinge on an upper surface of each of the rovings 142, or on a lower surface of each of the rovings 142, or on both an upper and lower surface of each of the rovings 142. Initial impingement on the rovings 142 provides for further impregnation of the rovings 142 with the resin 214.

Figure 2C:
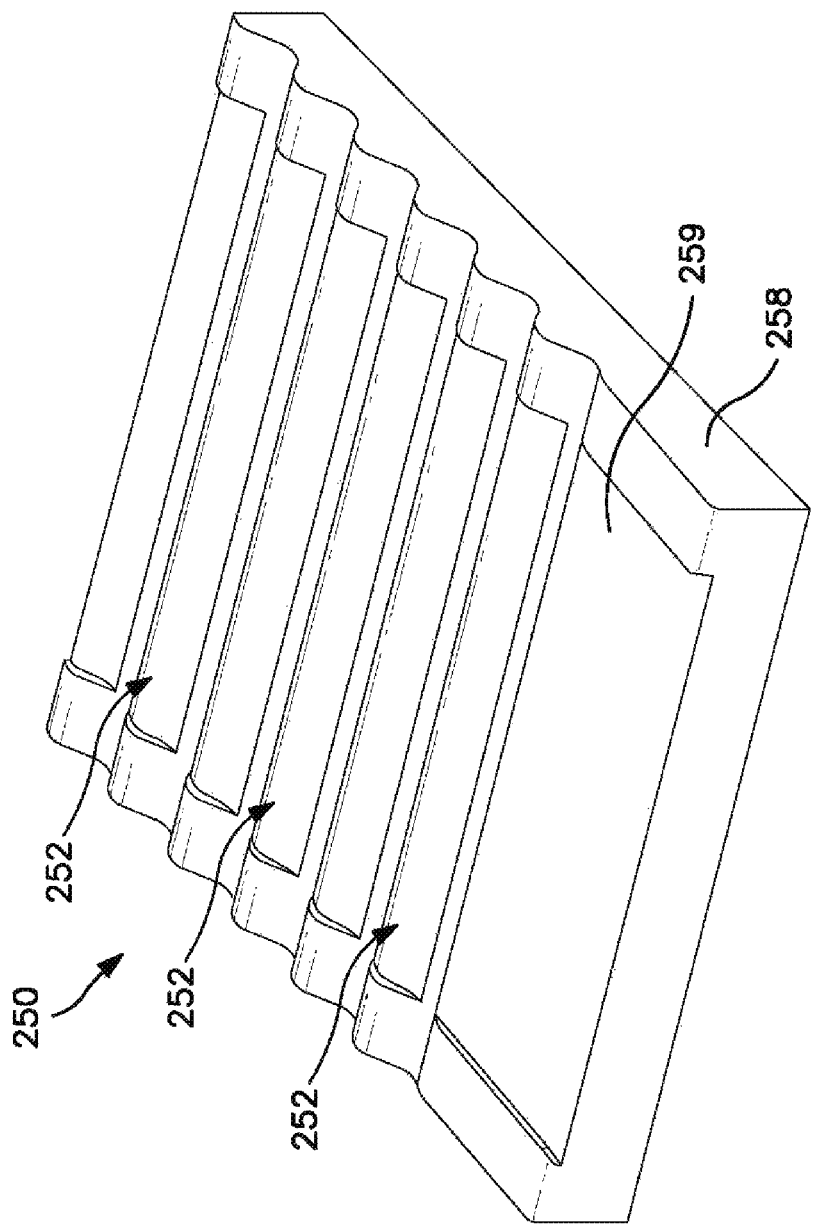
FIG. 2C is a perspective view of one embodiment of a plate at least partially defining an impregnation zone that may be employed in the present invention.

As shown in FIG. 2A, the coated rovings 142 are traversed in run direction 282 through impregnation zone 250, which is configured to impregnate the rovings 142 with the resin 214. For example, as shown in FIGS. 2A and 2C, the rovings 142 are traversed over contact surfaces 252 in the impregnation zone. Impingement of the rovings 142 on the contact surface 252 creates shear and pressure sufficient to impregnate the rovings 142 with the resin 214 coating the rovings 142.

In some embodiments, as shown in FIG. 2A, the impregnation zone 250 is defined between two spaced apart opposing plates 256 and 258. First plate 256 defines a first inner surface 257, while second plate 258 defines a second inner surface 259. The contact surfaces 252 may be defined on or extend from both the first and second inner surfaces 257 and 259, or only one of the first and second inner surfaces 257 and 259. FIG. 2C illustrates the second plate 258 and the various contact surfaces thereon that form at least a portion of the impregnation zone 250 according to these embodiments. In exemplary embodiments, as shown in FIG. 2A, the contact surfaces 252 may be defined alternately on the first and second surfaces 257 and 259 such that the rovings alternately impinge on contact surfaces 252 on the first and second surfaces 257 and 259. Thus, the rovings 142 may pass contact surfaces 252 in a waveform, tortuous or sinusoidual-type pathway, which enhances shear.

The angle 254 at which the rovings 142 traverse the contact surfaces 252 may be generally high enough to enhance shear, but not so high to cause excessive forces that will break the fibers. Thus, for example, the angle 254 may be in the range between approximately 1° and approximately 30°, and in some embodiments, between approximately 5° and approximately 25°.

In alternative embodiments, the impregnation zone 250 may include a plurality of pins (not shown), each pin having a contact surface 252. The pins may be static, freely rotational, or rotationally driven. In further alternative embodiments, the contact surfaces 252 and impregnation zone 250 may comprise any suitable shapes and/or structures for impregnating the rovings 142 with the resin 214 as desired or required.

To further facilitate impregnation of the rovings 142, they may also be kept under tension while present within the impregnation die. The tension may, for example, range from about 5 to about 300 Newtons, in some embodiments from about 50 to about 250 Newtons, and in some embodiments, from about 100 to about 200 Newtons per roving 142 or tow of fibers.

As shown in FIG. 2A, in some embodiments, a land zone 280 may be positioned downstream of the impregnation zone 250 in run direction 282 of the rovings 142. The rovings 142 may traverse through the land zone 280 before exiting the die 150. As further shown in FIG. 2A, in some embodiments, a faceplate 290 may adjoin the impregnation zone 250. Faceplate 290 is generally configured to meter excess resin 214 from the rovings 142. Thus, apertures in the faceplate 290, through which the rovings 142 traverse, may be sized such that when the rovings 142 are traversed therethrough, the size of the apertures causes excess resin 214 to be removed from the rovings 142.

The impregnation die shown and described above is but one of various possible configurations that may be employed in the present invention. In alternative embodiments, for example, the fibers may be introduced into a crosshead die that is positioned at an angle relative to the direction of flow of the polymer melt. As the fibers move through the crosshead die and reach the point where the polymer exits from an extruder barrel, the polymer is forced into contact with the fibers. It should also be understood that any other extruder design may also be employed, such as a twin screw extruder. Still further, other components may also be optionally employed to assist in the impregnation of the fibers. For example, a "gas jet" assembly may be employed in certain embodiments to help uniformly spread a bundle or tow of individual fibers, which may each contain up to as many as 24,000 fibers, across the entire width of the merged tow. This helps achieve uniform distribution of strength properties in the ribbon. Such an assembly may include a supply of compressed air or another gas that impinges in a generally perpendicular fashion on the moving fiber tows that pass across the exit ports. The spread fiber bundles may then be introduced into a die for impregnation, such as described above.

Regardless of the technique employed, the continuous fibers are oriented in the longitudinal direction (the machine direction "A" of the system of FIG. 1) to enhance tensile strength. Besides fiber orientation, other aspects of the ribbon and pultrusion process are also controlled to achieve the desired strength. For example, a relatively high percentage of continuous fibers are employed in the ribbon to provide enhanced strength properties. For instance, continuous fibers typically constitute from about 40 wt. % to about 90 wt. %, in some embodiments from about 50 wt. % to about 85 wt. %, and in some embodiments, from about 55 wt. % to about 75 wt. % of the ribbon. Likewise, thermoplastic polymer(s) typically constitute from about 10 wt. % to about 60 wt. %, in some embodiments from about 15 wt. % to about 50 wt. %, and in some embodiments, from about 25 wt. % to about 45 wt. % of the ribbon.

Furthermore, the profile is also formed from a combination of multiple continuous fibers ribbons, which are laminated together to form a strong, integrated structure having the desired thickness. The number of ribbons employed may vary based on the desired thickness and strength of the profile, as well as the nature of the ribbons themselves. In most cases, however, the number of ribbons is from 5 to 40, in some embodiments from 10 to 30, and in some embodiments, from 15 to 25.

The specific manner in which the ribbons are brought together and shaped is also carefully controlled to ensure that high strength profiles can be formed without adversely impacting the pultrusion apparatus. Referring to FIG. 3, for example, one particular embodiment of a system and method for forming a solid profile are shown. In this embodiment, a plurality of ribbons 12 are initially provided in a wound package on a creel 20. The creel 20 may be an unreeling creel that includes a frame provided with horizontal rotating spindles 22, each supporting a package. A pay-out creel may also be employed, particularly if desired to induce a twist into the fibers. It should also be understood that the ribbons may also be formed in-line with the formation of the profile. In one embodiment, for example, the extrudate 152 exiting the impregnation die 150 from FIG. 1 may be directly supplied to the system used to form a profile. A tension-regulating device 40 may also be employed to help control the degree of tension in the ribbons 12. The device 40 may include inlet plate 30 that lies in a vertical plane parallel to the rotating spindles 22 of the creel 20. The tension-regulating device 40 may contain cylindrical bars 41 arranged in a staggered configuration so that the ribbons 12 passes over and under these bars to define a wave pattern. The height of the bars can be adjusted to modify the amplitude of the wave pattern and control tension.

The ribbons 12 are heated in an oven 45 before entering the consolidation die. Heating may be conducted using any known type of oven, as in an infrared oven, convection oven, etc. During heating, the fibers are unidirectionally oriented to optimize the exposure to the heat and maintain even heat across the entire profile. The temperature to which the ribbons 12 are heated is generally high enough to soften the thermoplastic polymer to an extent that the ribbons can bond together. However, the temperature is not so high as to destroy the integrity of the material. The temperature may, for example, range from about 80° C. to about 250° C., in some embodiments from about 90° C. to about 200° C., and in some embodiments, from about 100° C. to about 150° C. In one particular embodiment, for example, acrylonitrile-butadiene-styrene (ABS) is used as the polymer, and the ribbons are heated to or above the melting point of ABS, which is about 105° C. In another embodiment, polybutylene terephalate (PBT) is used as the polymer, and the ribbons are heated to or above the melting point of PBT, which is about 224° C.

Upon being heated, the ribbons 12 are provided to a consolidation die 50 for bonding together into a laminate 14, as well as for alignment and formation of the initial shape of the profile. As shown in FIG. 4, for example, the ribbons 12 are guided through a channel 51 of the die 50 in a direction "A". The channel 51 may have any of a variety of shapes and/or sizes to achieve the profile configuration. Desirably, the size (width and/or height) of the channel 51 is slightly greater than the size of the laminate 14 to allow for expansion of the thermoplastic polymer while heated to minimize the risk of material backup within the die 50. For example, the width of the channel 51 may be about 2% or more, in some embodiments about 5% or more, and in some embodiments, from about 10% to about 20% greater than the width of the laminate 14. Similarly, the height of the channel 51 may be about 2% or more, in some embodiments about 5% or more, and in some embodiments, from about 10% to about 20% greater than the width of the laminate 14. Within the die 50, the ribbons are generally maintained at a temperature at or above the melting point of the thermoplastic matrix used in the ribbon to ensure adequate consolidation.

If desired, a second die 60 (e.g., calibration die) may also be employed that compresses the laminate 14 into the final shape for the profile. When employed, it is generally desired that the laminate 14 is allowed to cool briefly after exiting the consolidation die 50 and before entering the optional second die 60. This allows the consolidated laminate 14 to retain its initial shape before progressing further through the system. Such cooling may be accomplished by simply exposing the laminate 14 to the ambient atmosphere (e.g., room temperature) or through the use of active cooling techniques (e.g., water bath or air cooling) as is known in the art. In one embodiment, for example, air is blown onto the laminate 14 (e.g., with an air ring). The cooling between these stages, however, generally occurs over a small period of time to ensure that the laminate 14 is still soft enough to be further shaped. For example, after exiting the consolidation die 50, the laminate 14 may be exposed to the ambient environment for only from about 1 to about 20 seconds, and in some embodiments, from about 2 to about 10 seconds, before entering the second die 60. Within the die 60, the laminate is generally kept at a temperature below the melting point of the thermoplastic matrix used in the ribbon so that the shape of the profile can be maintained.

Although referred to above as single dies, it should be understood that the dies 50 and 60 may in fact be formed from multiple individual dies (e.g., face plate dies).

The resulting profile may also be applied with a capping layer to enhance the aesthetic appeal of the profile and/or protect it from environmental conditions. Referring again to FIG. 3, for example, such a capping layer may be applied via an extruder oriented at any desired angle to introduce a thermoplastic resin into a capping die 72. The resin may contain any suitable thermoplastic polymer known in the art that is generally compatible with the thermoplastic polymer used to form the profile. Suitable capping polymers may include, for instance, acrylic polymers, polyvinyl chloride (PVC), polybutylene terephthalate (PBT), ABS, polyolefins, polyesters, polyacetals, polyamids, polyurethanes, etc. Although the capping resin is generally free of fibers, it may nevertheless contain other additives for improving the final properties of the profile. Additive materials employed at this stage may include those that are not suitable for incorporating into the continuous fiber or long fiber layers. For instance, it may be desirable to add pigments to the composite structure to reduce finishing labor of shaped articles, or it may be desirable to add flame retardant agents to the composite structure to enhance the flame retarding features of the shaped article. Because many additive materials are heat sensitive, an excessive amount of heat may cause them to decompose and produce volatile gases. Therefore, if a heat sensitive additive material is extruded with an impregnation resin under high heating conditions, the result may be a complete degradation of the additive material. Additive materials may include, for instance, mineral reinforcing agents, lubricants, flame retardants, blowing agents, foaming agents, ultraviolet light resistant agents, thermal stabilizers, pigments, and combinations thereof. Suitable mineral reinforcing agents may include, for instance, calcium carbonate, silica, mica, clays, talc, calcium silicate, graphite, calcium silicate, alumina trihydrate, barium ferrite, and combinations thereof.

While not shown in detail herein, the capping die 72 may include various features known in the art to help achieve the desired application of the capping layer. For instance, the capping die 72 may include an entrance guide that aligns the incoming profile. The capping die may also include a heating mechanism (e.g., heated plate) that pre-heats the profile before application of the capping layer to help ensure adequate bonding.

Following optional capping, the shaped part 15 is then finally cooled using a cooling system 80 as is known in the art. The cooling system 80 may, for instance, be a vacuum sizer that includes one or more blocks (e.g., aluminum blocks) that completely encapsulate the profile while a vacuum pulls the hot shape out against its walls as it cools. A cooling medium may be supplied to the sizer, such as air or water, to solidify the profile in the correct shape.

Vacuum sizers are typically employed when forming the profile. Even if a vacuum sizer is not employed, however, it is generally desired to cool the profile after it exits the capping die (or the consolidation or calibration die if capping is not applied). Cooling may occur using any technique known in the art, such a vacuum water tank, cool air stream or air jet, cooling jacket, an internal cooling channel, cooling fluid circulation channels, etc. Regardless, the temperature at which the material is cooled is usually controlled to achieve optimal mechanical properties, part dimensional tolerances, good processing, and an aesthetically pleasing composite. For instance, if the temperature of the cooling station is too high, the material might swell in the tool and interrupt the process. For semi-crystalline materials, too low of a temperature can likewise cause the material to cool down too rapidly and not allow complete crystallization, thereby jeopardizing the mechanical and chemical resistance properties of the composite. Multiple cooling die sections with independent temperature control can be utilized to impart the optimal balance of processing and performance attributes. In one particular embodiment, for example, a vacuum water tank is employed that is kept at a temperature of from about 0° C. to about 30° C., in some embodiments from about 1° C. to about 20° C., and in some embodiments, from about 2° C. to about 15° C.

As will be appreciated, the temperature of the profile as it advances through any section of the system of the present invention may be controlled to yield optimal manufacturing and desired final composite properties. Any or all of the assembly sections may be temperature controlled utilizing electrical cartridge heaters, circulated fluid cooling, etc., or any other temperature controlling device known to those skilled in the art.

Referring again to FIG. 3, a pulling device 82 is positioned downstream from the cooling system 80 that pulls the finished profile 16 through the system for final sizing of the composite. The pulling device 82 may be any device capable of pulling the profile through the process system at a desired rate. Typical pulling devices include, for example, caterpillar pullers and reciprocating pullers. If desired, one or more sizing blocks (not shown) may also be employed. Such blocks contain openings that are cut to the exact profile shape, graduated from oversized at first to the final profile shape. As the profile passes therethrough, any tendency for it to move or sag is counteracted, and it is pushed back (repeatedly) to its correct shape. Once sized, the profile may be cut to the desired length at a cutting station (not shown), such as with a cut-off saw capable of performing cross-sectional cuts.

Through control over the various parameters mentioned above, profiles having a very high strength may be formed. For example, the profiles may exhibit a relatively high flexural modulus. The term "flexural modulus" generally refers to the ratio of stress to strain in flexural deformation (units of force per area), or the tendency for a material to bend. It is determined from the slope of a stress-strain curve produced by produced by a "three point flexural" test (such as ASTM D790-10, Procedure A or ISO 178). For example, the profile of the present invention may exhibit a flexural modulus of from about 10 Gigapascals ("GPa") or more, in some embodiments from about 10 to about 80 GPa, in some embodiments from about 20 to about 70 GPa, and in some embodiments, from about 30 to about 60 GPa. Furthermore, the maximum flexural strength (also known as the modulus of rupture or bend strength) may be about 250 Megapascals ("MPa") or more, in some embodiments from about 300 to about 1,000 MPa, and in some embodiments, from about 325 to about 700 MPa. The term "maximum flexural strength" generally refers to the maximum stress reached on a stress-strain curve produced by a "three point flexural" test (such as ASTM D790-10, Procedure A or ISO 178) at room temperature. It represents the ability of the material to withstand an applied stress to failure.

The profile may also has a very low void fraction, such as about 3% or less, in some embodiments about 2% or less, and in some embodiments, about 1% or less. The void fraction may be determined in the manner described above, such as using a "resin burn off" test in accordance with ASTM D 2584-08.

Figure 5:
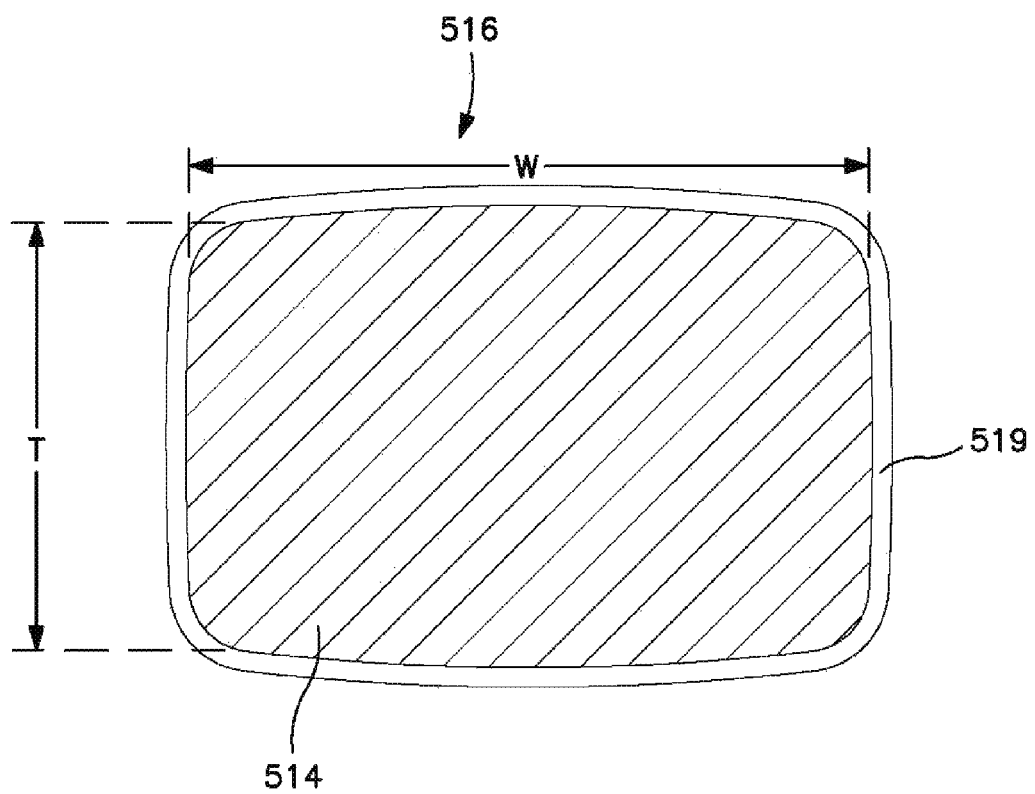
FIG. 5 is a cross-sectional view of one embodiment of the solid profile of the present invention.

One embodiment of the profile formed from the method described above is shown in more detail in FIG. 5 as element 516. As illustrated, the profile 516 has a generally rectangular shape and is formed from a continuous fiber component 514 formed from a plurality of laminated ribbons. A capping layer 519 also extends around the perimeter of the continuous fiber component 514 and defines an external surface of the profile 516. The cross-sectional thickness ("T") of the continuous fiber component 514 may be strategically selected to help achieve a particular strength for the profile. For example, the continuous fiber component 514 may have a thickness of from about 0.5 to about 40 millimeters, in some embodiments from about 1 to about 20 millimeters, and in some embodiments, from about 4 to about 10 millimeters. Likewise, the cross-sectional width ("W") may range from about 1 to about 50 millimeters, in some embodiments from about 4 to about 40 millimeters, and in some embodiments, from about 5 to about 30 millimeters. The thickness of the capping layer 519 depends on the intended function of the part, but is typically from about 0.01 to about 5 millimeters, and in some embodiments, from about 0.02 to about 1.5 millimeters. The total cross-sectional thickness or height of the profile 516 may also range from about 0.5 to about 45 millimeters, in some embodiments from about 1 to about 25 millimeters, and in some embodiments, from about 4 to about 15 millimeters.

As will be appreciated, the particular profile embodiment described above is merely exemplary of the numerous designs that are made possible by the present invention. Among the various possible profile designs, it should be understood that additional layers of material may be employed in addition to those described above. In certain embodiments, for example, it may be desirable to form a multi-component profile in which one component is formed from a higher strength material and another component is formed from a lower strength material. Such multi-component profiles may be particularly useful in increasing overall strength without requiring the need for more expensive high strength materials for the entire profile. The lower and/or higher strength components may be formed from ribbon(s) that contain continuous fibers embedded within a thermoplastic matrix. Typically, the ratio of the ultimate tensile strength (at room temperature) of the fibers used to form the high strength material and the fibers used to form the low strength material is from about 1.0 to about 3.0, in some embodiments from about 1.2 to about 2.5, and in some embodiments, from about 1.4 to about 2.0. When employing materials having such a strength difference, it is often desired that the high strength material is distributed generally symmetrically about the cross-sectional center of the profile. Such a symmetrical distribution helps prevent buckling or other mechanical problems that may occur during pultrusion due to the differences in material strength.

Figure 6:
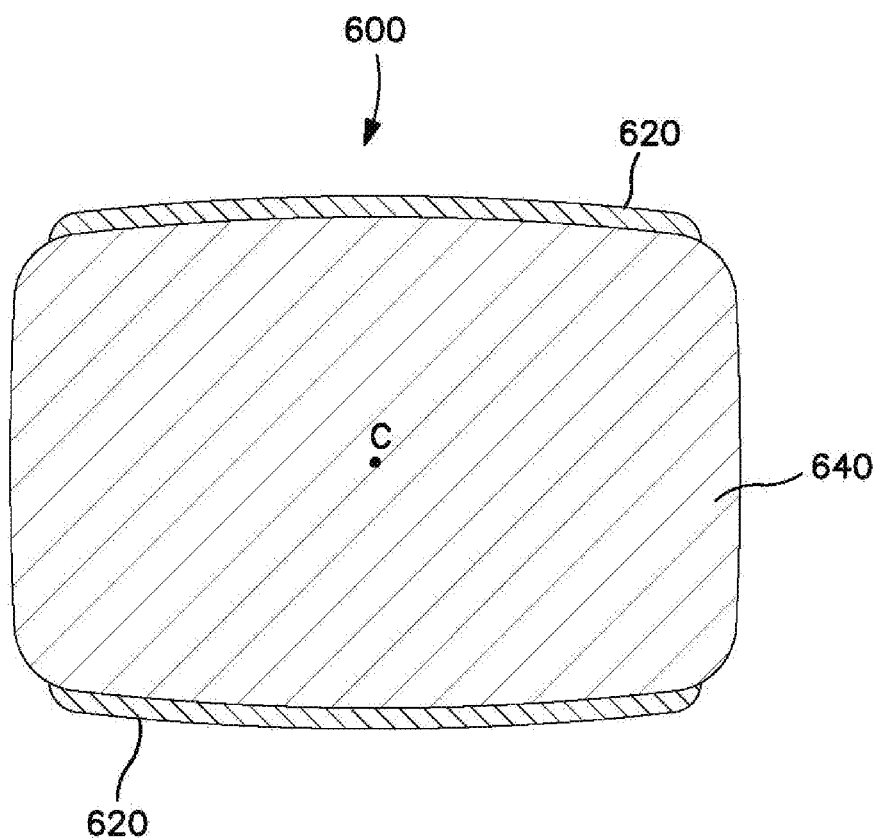
FIG. 6 is a cross-sectional view of another embodiment of the solid profile of the present invention.

Referring to FIG. 6, for example, one embodiment of a solid multi-component profile 600 is shown that contains a first "higher strength" component 620 and a second "lower strength" component 640. In this embodiment, each component is formed from a plurality of ribbons that contain continuous fibers embedded within a thermoplastic polymer matrix. The continuous fibers of the lower strength component 640 may, for example, be glass fibers (e.g., E-glass) while the continuous fibers of the higher strength component may be carbon fibers. As shown in FIG. 6, the higher strength component 620 is positioned so that it is adjacent to an upper surface and lower surface of the lower strength component, and thus symmetrically distributed about the cross-sectional center "C" of the profile 600. Such a profile 600 may be formed using techniques known to those skilled in the art. For example, the upper and lower ribbons unwound from the creel 20 (FIG. 3) may be carbon fiber ribbons, while the central ribbons may be glass fiber ribbons. All of the ribbons may thereafter be laminated and pultruded into the desired shape as shown and described herein.

Figure 7:
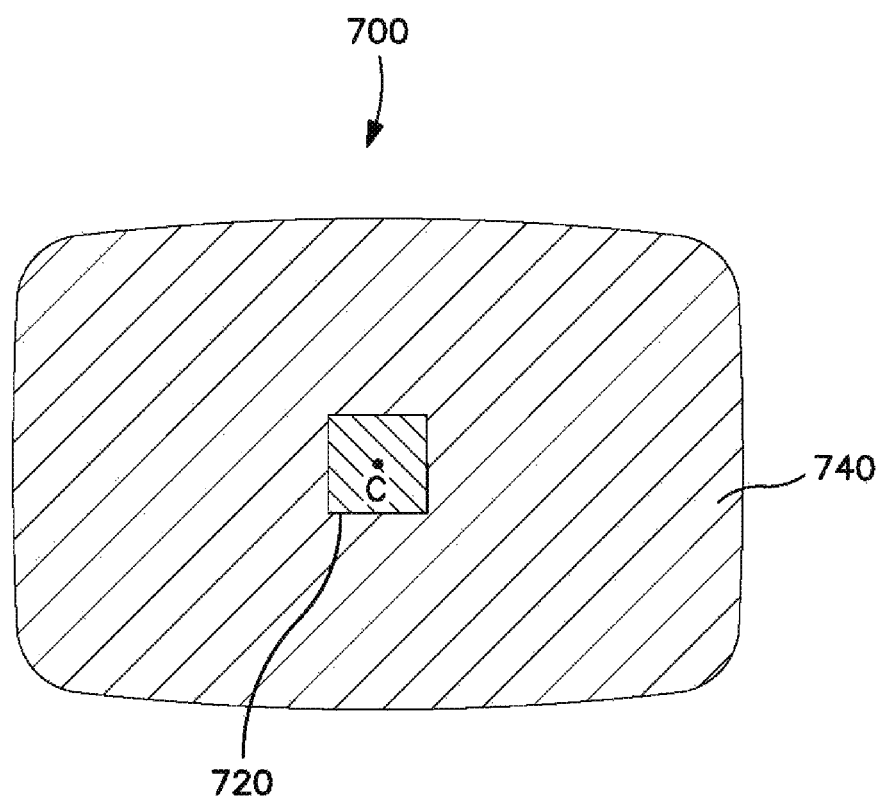
FIG. 7 is a cross-sectional view of yet another embodiment of the solid profile of the present invention.

FIG. 7 shows another embodiment of a multi-component profile 700 that contains a higher strength component 720 and a lower strength component 740. In this particular embodiment, the higher strength component (e.g., carbon fiber ribbon) are positioned within a central area of the profile 700 and distributed about a center "C." The lower strength component 740 (e.g., glass fiber ribbon) is likewise distributed about the periphery of the higher strength component 720.

It should be understood that the present invention is by no means limited to the embodiments described above. For example, the profiles may contain various other components depending on the desired application. The additional components may be formed from a continuous fiber ribbon, such as described herein, as well as other types of materials. In one embodiment, for example, the profile may contain a layer of discontinuous fibers (e.g., short fibers, long fibers, etc.) to improve its transverse strength. The discontinuous fibers may be oriented so that at least a portion of the fibers are positioned at an angle relative to the direction in which the continuous fibers extend.

As indicated above, the profiles of the present invention may be employed as a structural member for a wide variety of applications, including in windows, decking planks, railings, balusters, roofing tiles, siding, trim boards, pipes, fencing, posts, light posts, highway signage, roadside marker posts, etc. Windows, for example, may employ one or more structural members that contain the lineal profiles of the present invention. For example, the window may including a frame, sash, and glazing as described in U.S. Pat. No. 6,260,251 to Guhl, which is incorporated herein in its entirety by reference thereto for all purposes. The frame can be made of four individual frame members, while the sash can be made of four individual sash members. If desired, the profiles of the present invention may be used in any component of the window, but may be particularly desirable for use in forming all or a part of the frame members and/or sash members.

The present disclosure may be better understood with reference to the following examples.

EXAMPLE 1

Twenty one (21) continuous fiber ribbons were initially formed using an extrusion system as substantially described above and shown in FIGS. 1-2. Glass fiber rovings (E-glass, 2200 tex) were employed for the continuous fibers with each individual ribbon containing three (3) fiber rovings. The thermoplastic polymer used to impregnate the fibers was polybutylene terephalate, which has a melting point of about 224° C. Each ribbon contained 65.6 wt. % glass fibers and 34.4 wt. % PBS. The resulting ribbons had a thickness of between 0.2 to 0.4 millimeters and a void fraction of less than 1%.

Once formed, the twenty one (21) ribbons were then fed to a pultrusion line operating at a speed of 15 feet per minute. Prior to consolidation, the ribbons were heated within an infrared oven (power setting of 445). The heated ribbons were then supplied to a consolidation die, such as described above and shown in FIG. 3. The die contained a rectangular-shaped channel that received the ribbons and consolidated them together while forming the initial shape of the profile. Within the die, the ribbons remained at a temperature of about 227° C.—just above the melting point of the polybutylene terephalate matrix. Upon consolidation, the resulting laminate was then briefly cooled with an air ring/tunnel device that supplied ambient air at a pressure of 8.5 psi. The laminate was then passed through a nip formed between two rollers, and then to a calibration die for final shaping. Within the calibration die, the laminate remained at a temperature of about 177° C. The resulting part was then supplied to several sizing blocks (or dies) to impart the final solid rectangular shape and cooled using a water tank at a temperature of about 7° C. The profile had a thickness of 5.87 millimeters and a width of 19.94 millimeters.

To determine the strength properties of the profile, three-point flexural testing was performed in accordance with ASTM D790-10, Procedure A. The support and nose radius was 5 millimeters, the support span was 3.68 inches, the specimen depth was 16×, and the test speed was 0.1 inches per minute. The resulting flexural modulus was 34.6 Gigapascals and the flexural strength was 546.8 Megapascals. The density of the part was 1.917 g/cm$^3$ and the void content was 0.51%. Further, the ash content was 66.5%.

EXAMPLE 2

Eighteen (18) continuous glass fiber ribbons and (6) carbon fiber ribbons were initially formed using an extrusion system as substantially described above and shown in FIGS. 1-2. Glass fiber rovings (E-glass, 2200 tex) and carbon fiber rovings were employed for the continuous fibers with each individual ribbon containing three (3) fiber rovings. The thermoplastic polymer used to impregnate the fibers was polybutylene terephalate, which has a melting point of about 224° C. Each ribbon contained 65.6 wt. % glass fibers and 34.4 wt. % PBT or 50 wt. % carbon fiber and 50 wt. % PBT. The resulting ribbons had a thickness of between 0.2 to 0.4 millimeters and a void fraction of less than 1%.

Once formed, the ribbons were then fed to a pultrusion line operating at a speed of 15 feet per minute. Prior to consolidation, the ribbons were heated within an infrared oven (power setting of 445). The heated ribbons were then supplied to a consolidation die, such as described above and shown in FIG. 3. The die contained a rectangular-shaped channel that received the ribbons and consolidated them together while forming the initial shape of the profile. Within the die, the ribbons remained at a temperature of about 227° C., just above the melting point of the polybutylene terephalate matrix. Upon consolidation, the resulting laminate was then briefly cooled with an air ring/tunnel device that supplied ambient air at a pressure of 5 psi. The laminate was then passed through a nip formed between two rollers, and then to a calibration die for final shaping. Within the calibration die, the laminate remained at a temperature of about 177° C. The resulting part was then supplied to several sizing blocks (or dies) to impart the final solid rectangular shape and cooled using a water tank at a temperature of about 7° C. The profile had a thickness of 5.87 millimeters and a width of 19.94 millimeters.

To determine the strength properties of the profile, three-point flexural testing was performed in accordance with ASTM D790-10, Procedure A. The support and nose radius was 5 millimeters, the support span was 3.68 inches, the specimen depth was 16×, and the test speed was 0.1 inches per minute. The resulting flexural modulus was 48 Gigapascals and the flexural strength was 350 Megapascals.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A method for forming a solid lineal profile, the method comprising:
   supplying a plurality of individual ribbons, wherein each ribbon contains a plurality of continuous fibers that are substantially oriented in a longitudinal direction and a resinous matrix that contains one or more thermoplastic polymers and within which the continuous fibers are embedded, the continuous fibers constituting from about 40 wt. % to about 90 wt. % of the ribbon and the thermoplastic polymers constituting from about 10 wt. % to about 60 wt. % of the ribbon, each ribbon formed from a consolidated plurality of resinous matrix impregnated fiber rovings;
   heating the ribbons to a temperature at or above the softening temperature of the resinous matrix;
   after heating of the ribbons, pulling the heated ribbons through a first die to consolidate the ribbons together and form a laminate and through a second die to shape the laminate; and
   after pulling the heating ribbons through the first die and the second die, cooling the shaped laminate to form the solid profile.

2. The method of claim 1, wherein the continuous fibers include glass fibers, carbon fibers, or a combination of glass and carbon fibers.

3. The method of claim 1, wherein the thermoplastic polymers include a polyolefin, polyether ketone, polyetherimide, polyarylene ketone, liquid crystal polymer, polyarylene sulfide, fluoropolymer, polyacetal, polyurethane, polycarbonate, styrenic polymer, polyester, polyamide, or a combination thereof.

4. The method of claim 1, wherein the continuous fibers constitute from about 50 wt. % to about 85 wt. % of the ribbon.

5. The method of claim 1, wherein the ribbon has a void faction of about 2% or less.

6. The method of claim 1, wherein from 10 to 30 individual ribbons are employed to form the laminate.

7. The method of claim 1, wherein the ribbons are heated within an infrared oven.

8. The method of claim 1, wherein the laminate is allowed to cool after exiting the first die and before entering the second die.

9. The method of claim 1, wherein annealing is conducted with a water tank that is maintained at a temperature of from about 1° C. to about 15° C.

10. The method of claim 1, wherein a first portion of the ribbons has a greater tensile strength in the longitudinal direction than a second portion of the ribbons.

11. The method of claim 1, wherein continuous fibers of the first portion include carbon fibers and continuous fibers of the second portion include glass fibers.

12. The method of claim 1, wherein the profile has a void faction of about 2% or less.

13. The method of claim 1, wherein the profile has a flexural modulus of about 10 Gigapascals or more and a flexural strength of from about 250 Megapascals or more.

* * * * *